(12) United States Patent
Utsunomiya

(10) Patent No.: US 8,736,775 B2
(45) Date of Patent: May 27, 2014

(54) COOLING DEVICE FOR ELECTRONIC APPARATUS AND LIQUID CRYSTAL PROJECTOR

(75) Inventor: Motoyasu Utsunomiya, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 446 days.

(21) Appl. No.: 12/733,376

(22) PCT Filed: Sep. 26, 2008

(86) PCT No.: PCT/JP2008/067988
§ 371 (c)(1),
(2), (4) Date: Feb. 25, 2010

(87) PCT Pub. No.: WO2009/041726
PCT Pub. Date: Apr. 2, 2009

(65) Prior Publication Data
US 2010/0208151 A1    Aug. 19, 2010

(30) Foreign Application Priority Data

Sep. 28, 2007 (JP) .................... 2007-254432

(51) Int. Cl.
G02F 1/13 (2006.01)
G02F 1/1335 (2006.01)
G02F 1/00 (2006.01)
G03B 21/26 (2006.01)

(52) U.S. Cl.
USPC ............... 349/1; 349/5; 349/6; 349/7; 349/8; 349/15; 353/30; 353/34; 359/322

(58) Field of Classification Search
USPC ........... 349/5–9, 11; 359/322; 353/30, 34, 83
See application file for complete search history.

(56) References Cited

U.S. PATENT DOCUMENTS

| 5,743,610 A | * | 4/1998 | Yajima et al. ................... 353/31 |
| 6,007,205 A | * | 12/1999 | Fujimori ......................... 353/57 |
| 6,334,686 B1 | | 1/2002 | Shiraishi et al. |
| 6,392,780 B1 | * | 5/2002 | Fujimori ....................... 359/246 |
| 6,394,608 B1 | * | 5/2002 | Shiraishi et al. ................ 353/57 |

(Continued)

FOREIGN PATENT DOCUMENTS

| EP | 1 389 008 A1 | 2/2004 |
| JP | 61-128235 A | 6/1986 |

(Continued)

OTHER PUBLICATIONS

Japanese Office Action dated Sep. 7, 2011.

*Primary Examiner* — Hoan C Nguyen
(74) *Attorney, Agent, or Firm* — McGinn IP Law Group, PLLC

(57) ABSTRACT

A cooling device for use in an electronic apparatus is capable of achieving a sufficient cooling capability with an effective replacement method in a narrow flow path. The cooling device for the electronic apparatus, which includes a plurality of members juxtaposed such that surfaces thereof confront each other, at least one of the members including a heat radiating surface, includes a first air-cooling member which includes a first outlet port that creates a first air stream, and a second air-cooling member which includes a second outlet port that creates a second air stream to flow in a direction different from the first air stream. The first and second outlet ports have different opening widths, respectively.

19 Claims, 10 Drawing Sheets

(56) References Cited

U.S. PATENT DOCUMENTS

| | | |
|---|---|---|
| 2002/0075457 A1 | 6/2002 | Wang et al. |
| 2004/0075818 A1 | 4/2004 | Suzuki et al. |
| 2004/0227901 A1* | 11/2004 | Kobayashi ............... 353/61 |
| 2005/0036115 A1* | 2/2005 | Kim et al. ............... 353/61 |
| 2010/0033687 A1* | 2/2010 | Utsunomiya ............ 353/58 |

FOREIGN PATENT DOCUMENTS

| | | |
|---|---|---|
| JP | 62-69257 A | 3/1987 |
| JP | 5-267874 A | 10/1993 |
| JP | 6-196887 A | 7/1994 |
| JP | 8-162789 A | 6/1996 |
| JP | 9-293983 A | 11/1997 |
| JP | 11-295814 | 10/1999 |
| JP | 2000-124649 | 4/2000 |
| JP | 2000-221598 A | 8/2000 |
| JP | 2000-252669 A | 9/2000 |
| JP | 2001-318361 | 11/2001 |
| JP | 2002-217576 A | 8/2002 |
| JP | 2004-138911 A | 5/2004 |
| JP | 2004-246108 A | 9/2004 |
| JP | 2005-4071 A | 1/2005 |
| JP | 2005-337517 A | 12/2005 |
| JP | 2006-145942 | 6/2006 |
| JP | 2006-171165 | 6/2006 |
| WO | WO 03/075081 A1 | 9/2003 |
| WO | WO 2008/050660 A2 | 5/2008 |

* cited by examiner

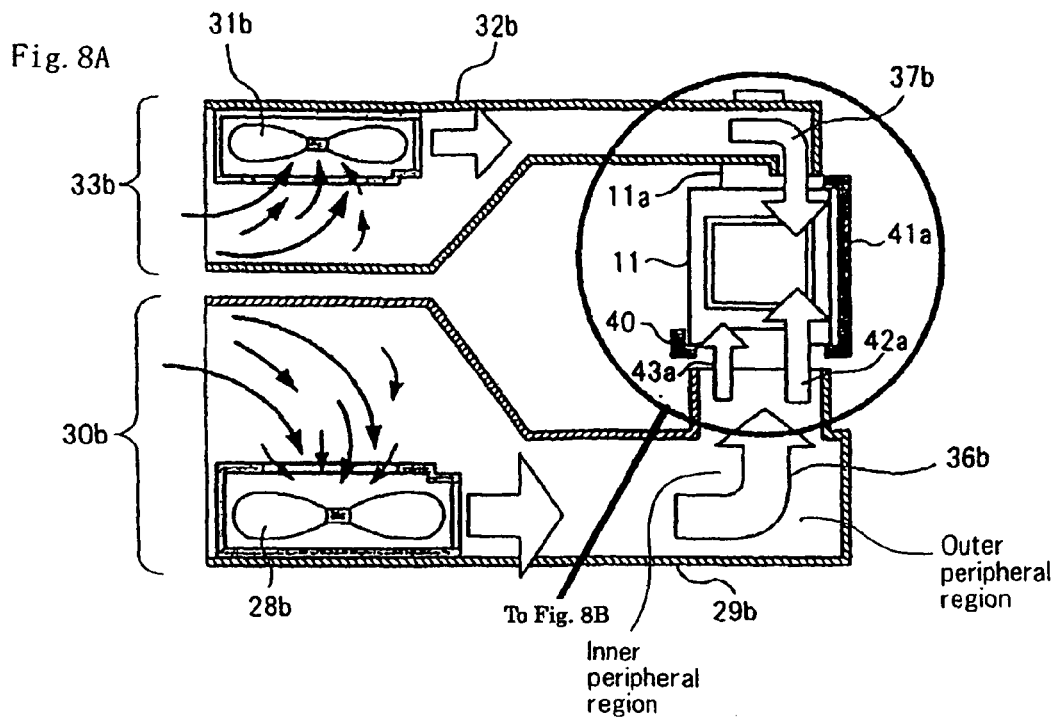
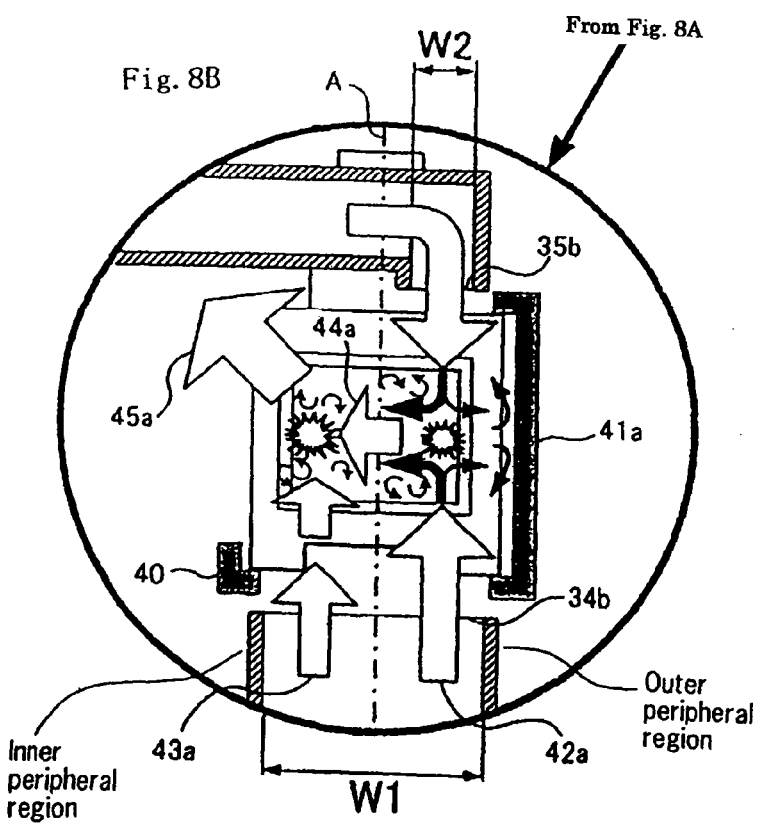
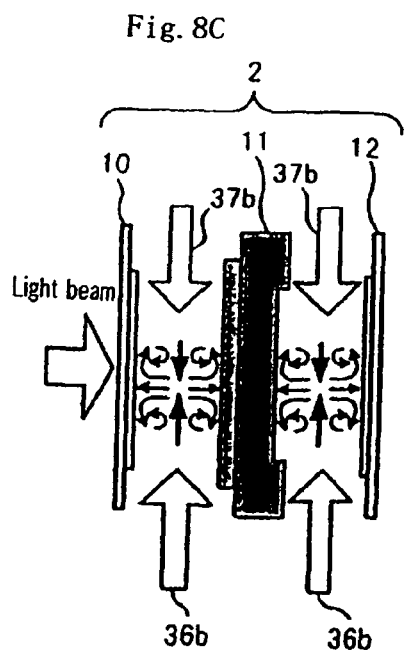

COOLING DEVICE FOR ELECTRONIC APPARATUS AND LIQUID CRYSTAL PROJECTOR

BACKGROUND OF THE INVENTION

1. Field of the Invention

The present invention relates to a cooling device for use in an electronic apparatus such as a liquid crystal projector, and more particularly to a cooling device for cooling the surface of a member which gives off heat.

2. Description of the Related Art

Cooling devices comprising a fan for forced air cooling are widely used as cooling means for electronic apparatus because they are inexpensive and simple in structure. Liquid crystal projectors also employ a cooling device which comprises a plurality of fans for forced air cooling of optical components which give off heat in the liquid crystal projectors.

In the liquid crystal projectors, a light beam from a light source is applied to a polarizing beam splitter. The light beam polarized by the polarizing beam splitter is separated into red, green, and blue light beams corresponding to the three primary colors. The red light beam is applied to a red liquid crystal panel, the green light beam to a green liquid crystal panel, and the blue light beam to a blue liquid crystal panel. The liquid crystal panels optically modulate the respective applied light beams with a video signal. The optically modulated light beams are combined by a color combining prism into a single light beam, which is projected onto a screen by a projecting lens.

Each of the liquid crystal panels comprises a matrix of liquid crystal cells and a light shielding area called a "black matrix" surrounding each of the liquid crystal cells. When the black matrix absorbs light, the liquid crystal panel produces heat.

If the liquid crystal panels comprise liquid crystal panels that operate in a TN (Twisted Nematic) mode, then polarizer plates are disposed respectively on the entrance and exit sides of each of the liquid crystal panels. The polarizer plates pass only certain polarized light, e.g., S-polarized light, and block other light. When the polarizer plates block light, they convert the light into heat. Therefore, the polarizer plates also produce heat.

The liquid crystal panels and the polarizer plates are often made of an organic material. Therefore, if the liquid crystal panels and the polarizer plates are kept at high temperatures for a long period of time, then alignment layers of the liquid crystal panels may be damaged and polarization selectivity may be lowered. Therefore, liquid crystal projectors incorporate cooling devices for cooling components that give off heat, such as liquid crystal panels and polarizer plates.

A cooling device for use in liquid crystal projectors will be described below. Liquid crystal panels and polarizer plates disposed on the entrance and exit sides of the liquid crystal panels will hereinafter be referred to as "a liquid crystal unit".

FIGS. 1A through 1C are views showing a liquid crystal projector according to the related art. FIG. 1A is a perspective view of the liquid crystal projector, FIG. 1B is a perspective view showing internal structural details of the liquid crystal projector, and FIG. 1C is a view showing the layout of components of the liquid crystal projector.

As shown in FIGS. 1A through 1C, liquid crystal projector 1 has a casing which houses therein liquid crystal unit assembly 2, cooling fan 3, air cooling duct 4, light source 5, power supply unit 6, lamp cooling fan 7, exhaust fan 8, and projecting lens 9.

Liquid crystal unit assembly 2 comprises R, G, B liquid crystal units. Each of the liquid crystal units comprises a liquid crystal panel and polarizer plates disposed on the entrance and exit sides of the liquid crystal panel. A light beam from light source 5 is separated into red, green, and blue light beams by a plurality of dichroic mirrors. The separated red, green, and blue light beams are supplied to the respective liquid crystal units of liquid crystal unit assembly 2. The red, green, and blue light beams are spatially modulated by the liquid crystal units into image light beams, which are combined by a color combining prism. The combined image light beam from the color combining prism is projected onto a screen by projecting lens 9.

Lamp cooling fan 7 serves as a means for cooling light source 5. An air stream produced by lamp cooling fan 7 flows through a lamp cooling duct to light source 5. Cooling fan 3 and air cooling duct 4 serve as a means for cooling liquid crystal unit assembly 2. An air stream produced by air cooling fan 3 flows through air cooling duct 4 to the liquid crystal units of liquid crystal unit assembly 2. Exhaust fan 8 discharges air in the casing out of the casing.

FIGS. 2A and 2B are views showing specific structural details of a cooling device for cooling liquid crystal units. FIG. 2A is an exploded perspective view of the cooling device, and FIG. 2B is a cross-sectional view illustrative of a cooling action of the cooling device.

As shown in FIGS. 2A and 2B, liquid crystal unit assembly 2 comprises three liquid crystal units. Each of the liquid crystal units comprises liquid crystal panel 11 and polarizer plates 10, 12 disposed respectively on the entrance and exit sides of liquid crystal panel 11.

Cooling device 13 comprises air cooling fan 3 and air cooling duct 4. Air cooling duct 4 has a portion positioned below liquid crystal unit assembly 2 and having three outlet ports 15 for ejecting air streams toward the respective liquid crystal units. The air streams flow through air cooling duct 4 and are directed from respective outlet ports 15 toward the respective liquid crystal units. The air streams from outlet ports 15 pass upwardly through spaces (gaps) between polarizer plates 10 and liquid crystal panels 11 and between liquid crystal panels 11 and polarizer plates 12. As the air streams flowing out of outlet ports 15 pass through the gaps between liquid crystal panels 11 and polarizer plates 10, 12, they cool liquid crystal panels 11 and polarizer plates 10, 12.

JP-A No. 11-295814 discloses another cooling device for cooling a liquid crystal unit. FIG. 3 is a view showing structural details of the disclosed cooling device.

As shown in FIG. 3, air streams from cooling fan 3 flow between polarizer plate 10 and liquid crystal panel 11 and between liquid crystal panel 11 and color combining prism 16. Air deflecting plate 17 for changing the direction of the air stream from cooling fan 3 is mounted on a portion of a member which holds color combining prism 16 near cooling fan 3. The air stream from cooling fan 3 has its direction changed by air deflecting plate 17, and is directed toward the surface of liquid crystal panel 11. The direction of the air stream is thus changed to improve the cooling efficiency of liquid crystal panel 13.

JP-A No. 2001-318361 discloses still another cooling device for cooling a liquid crystal unit. FIG. 4 is a view showing structural details of the disclosed cooling device.

As shown in FIG. 4, liquid crystal panel 11 is held by holding frame 18 having two protrusions 19 along the opposite edges thereof. Protrusions 19 are in the form of plate-like members for limiting an air stream supplied from duct outlet port 20 to flow in one direction, thereby keeping a flow rate (air rate) of the air stream flowing along the surface of liquid crystal panel 11.

JP-A No. 2000-124649 discloses yet another cooling device for cooling a liquid crystal unit. FIGS. 5A and 5B are views showing structural details of the disclosed cooling device. FIG. 5A is a plan view, and FIG. 5B is a sectional side elevational view.

As shown in FIGS. 5A and 5B, air guide 21 having a U-shaped cross section is mounted on and extends between color combining prism 16 and polarizer plate 10 that are disposed in confronting relation to each other with liquid crystal panel 11 interposed therebetween. An air stream from cooling fan 3 passes between color combining prism 16 and liquid crystal panel 11, and thereafter is caused to flow back by air guide 21. The air stream caused to flow back by air guide 21 passes between liquid crystal panel 11 and polarizer plate 10. This structure is effective to prevent temperature irregularities on the surface of liquid crystal panel 11.

JP-A No. 2000-124649 also discloses a modification of the above cooling device. FIGS. 6A and 6B are views showing such a modification. FIG. 6A is a plan view, and FIG. 6B is a sectional side elevational view. According to the modification, lower cooling fan 22 is disposed below liquid crystal panel 11, and upper cooling fan 23 is disposed above liquid crystal panel 11. An air stream from lower cooling fan 22 passes upwardly between color combining prism 16 and liquid crystal panel 11. An air stream from upper cooling fan 23 passes downwardly between liquid crystal panel 11 and polarizer plate 10. The modification is also effective to prevent temperature irregularities on the surface of liquid crystal panel 11.

Generally, attempts to improve the heat transfer coefficient for promoting the heat transfer in forced air cooling for a heated flat plate include two approaches, "thinned layer method" and "replacement method".

The former "thinned layer method" is a method of promoting the heat transfer from a heated body to a coolant (air) by thinning a thermal boundary layer (thinned layer) on the surface of the heated body. Since the thickness of the thermal boundary layer is inversely proportional to the square root of the velocity in the direction of a main flow (the flow velocity of a flow along the surface of a flat plate), the flow velocity may be increased for lowering the temperature of the heated body.

However, if the flow velocity from a fan is increased for the purpose of improving the cooling capability, then the operating noise of the fan becomes worse and the volume of the fan increases. Furthermore, inasmuch as the heat transfer coefficient is proportional to the square root of the flow velocity (=thickness of the thermal boundary layer is inversely proportional to the square root of the flow velocity) (laminar flow), the thinned layer method is problematic in that if the temperature is lowered to a certain level, then it will not be significantly lowered further no matter how much the flow velocity is increased (air cooling limitation). The cooling device shown in FIGS. 2A and 2B and the cooling devices disclosed in JP-A No. 2001-318361 and JP-A No. 2000-124649 are classified as cooling devices according to the method of cooling a heated flat plate based on the "thinned layer" method. These cooling devices are facing the above problem as liquid crystal projectors are required to be smaller in size, higher in luminance, and longer in product-life cycle.

The latter "replacement method" is a method of promoting the heat transfer by creating a turbulent flow of air to accelerate the generation/elimination of unsteady vortexes for thereby forcibly exchanging a fluid near the surface of the heated body (high temperature) and a fluid spaced a little from the surface of the heated body (low temperature).

One typical example of the "replacement method" is impinging jet cooling. The impinging jet cooling refers to a cooling method for causing a jet (a coolant such as water or air) from a nozzle to impinge perpendicularly upon a heated flat plate to radiate heat therefrom.

According to the impinging jet cooling, the heated surface is effectively cooled by the following three processes:

1) the breakage (peeling) of the thermal boundary layer on the surface of the heated body due to the impingement of the jet;

2) the fluid exchange (temperature replacement) due to swirling vortexes generated on the impinging surface; and 3) the slippage on the wall surface of the jet due to the Coanda effect.

The Coanda effect refers to the property of a fluid such that when an object is placed in a fluid flow, the pressure between the fluid and the solid wall surface of the object drops to attract the fluid flow to the wall surface, causing the fluid to flow along the solid wall surface of the object.

If the impinging jet cooling is applied to a process of cooling the liquid crystal units of a liquid crystal projector, then the position of the nozzle for producing the jet is of importance. Specifically, since the liquid crystal panels and the polarizer plates give off heat as they absorb light passing therethrough, the surface which gives off heat and the surface through which light passes essentially coincide with each other. Therefore, it is important to generate an air flow (impinging jet) of air perpendicularly to the heated surface so as not to block the transmission of the light in the small gaps between the liquid crystal panels and the polarizer plates.

According to the cooling device disclosed in JP-A No. 11-295814, the air deflecting plate at the duct outlet controls the amount and direction of air applied to the liquid crystal panel to improve the cooling capability. The disclosed cooling device is classified into something between the "thinned layer method" and the "replacement method". Since the amount of air applied to the polarizer plate which is positioned opposite to the liquid crystal panel is reduced, the cooling capability for the polarizer plate is lowered. For tilting the air flow between the liquid crystal panel and the polarizer plate with the air deflecting plate at the duct outlet, the liquid crystal panel and the polarizer plate need to be spaced sufficiently apart from each other. Unless they are spaced sufficiently apart from each other, the air flow therebetween cannot effectively be tilted, and the flow path is closed instead, resulting in a reduction in the cooling capability. Furthermore, even if the air is delivered obliquely to the liquid crystal panel, its cooling capability is far from the cooling capability which would be achieved by the impinging jet.

SUMMARY OF THE INVENTION

It is an exemplary purpose of the present invention to provide a cooling device for use in an electronic apparatus which is capable of achieving a sufficient cooling capability with an effective replacement method in a narrow flow path, and a projector incorporating such a cooling device.

According to the present invention, a cooling device for an electronic apparatus including a plurality of members juxtaposed such that surfaces thereof confront each other, at least one of the members including a heat radiating surface, comprises:

a first air-cooling member which includes a first outlet port that creates a first air stream to flow along the heat radiating surface; and a second air-cooling member which includes a second outlet port that creates a second air stream to flow along the heat radiating surface in a direction different from the first air stream, wherein the first outlet port and the second outlet port have different opening widths in a sectional plane parallel to the heat radiating surface.

According to the present invention, a liquid projector comprises:

a liquid crystal panel;

a first optical device disposed on an entrance side of the liquid crystal panel;

a second optical device disposed on an exit side of the liquid crystal panel;

a first air-cooling member which includes a first outlet port that creates a first air stream to flow along confronting surfaces of the liquid crystal panel and the first and second optical devices; and a second air-cooling member which includes a second outlet port that creates a second air stream to flow along the confronting surfaces in a direction different from the first air stream, the first outlet port and the second outlet port having different opening widths in a sectional plane parallel to the surfaces of the liquid crystal panel.

The above and other purposes, features, and advantages of the present invention will become apparent from the following description with reference to the accompanying drawings which illustrate examples of the present invention.

BRIEF DESCRIPTION OF THE DRAWINGS

FIG. 8A is a cross-sectional view of the overall structure of a cooling device according to a second exemplary embodiment of the present invention;

FIG. 8B is a partial enlarged view showing the manner in which air flows on the surface of a liquid crystal panel 11 of a liquid crystal unit in the cooling device shown in FIG. 8A as it is viewed in the direction in which light is applied to the liquid crystal panel;

FIG. 8C is a view showing the manner in which air flows on the liquid crystal panel 11 of the liquid crystal unit shown in FIG. 8B as it is viewed in side elevation;

DETAILED DESCRIPTION OF THE EXEMPLARY EMBODIMENTS

Exemplary embodiments of the present invention will be described below with reference to the drawings.

1st Exemplary Embodiment

Figure 7A:
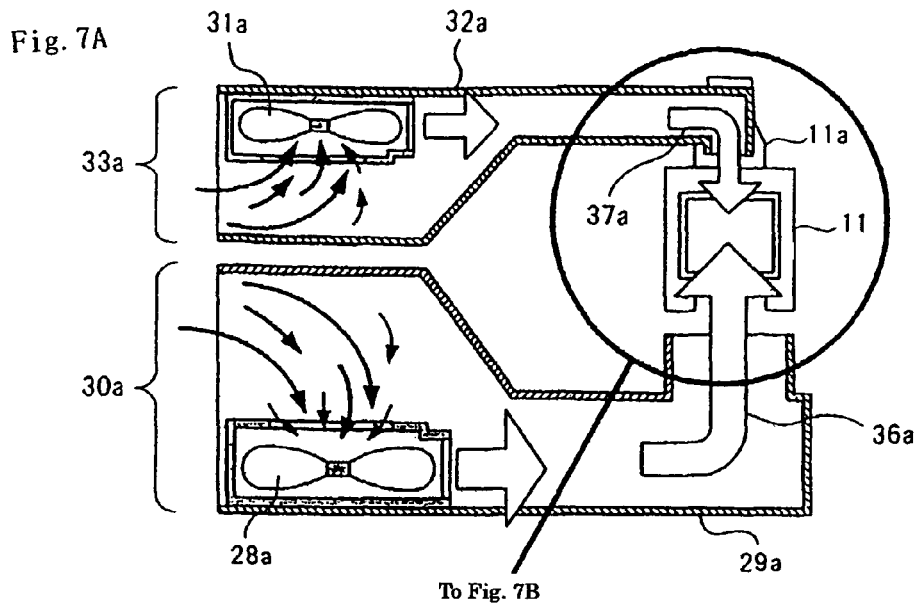
FIG. 7A is a cross-sectional view of the overall structure of a cooling device according to a first exemplary embodiment of the present invention.
Figure 7B:
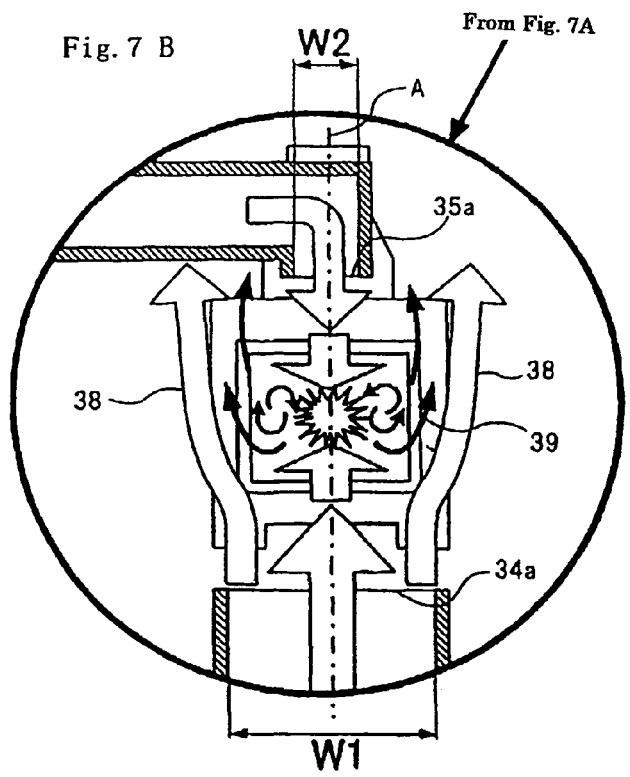
FIG. 7B is a partial enlarged view showing the manner in which air flows on the surface of a liquid crystal panel 11 of a liquid crystal unit in the cooling device shown in FIG. 7A as it is viewed in the direction in which light is applied to the liquid crystal panel.
Figure 7C:
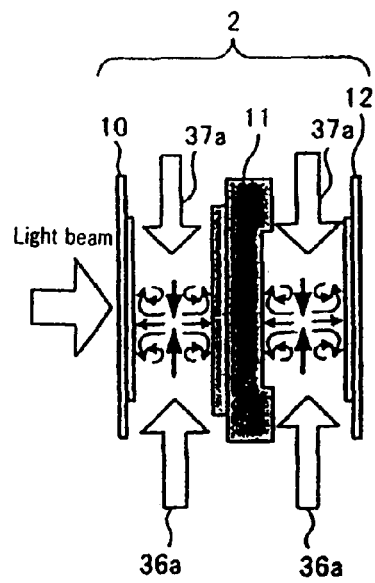
FIG. 7C is a view showing the manner in which air flows on the liquid crystal panel 11 of the liquid crystal unit shown in FIG. 7B as it is viewed in side elevation.

FIGS. 7A through 7C are views showing a cooling device according to a first exemplary embodiment of the present invention. FIG. 7A is a cross-sectional view of the overall structure of the cooling device, FIG. 7B is a partial enlarged view showing the manner in which air flows on the surface of a liquid crystal panel of a liquid crystal unit as it is viewed in the direction in which light is applied to the liquid crystal panel, and FIG. 7C is a view showing the manner in which air flows on the liquid crystal panel 11 of the liquid crystal unit as it is viewed in side elevation.

The cooling device shown in FIGS. 7A through 7C serves to cool liquid crystal unit assembly 2 of a liquid crystal projector, and has two air-cooling units 30a, 33a. In FIGS. 7A through 7C, only one of three liquid crystal units of liquid crystal unit assembly 2 is shown for illustrative purpose. As shown in FIG. 7C, the liquid crystal unit comprises liquid crystal panel 11 and polarizer plates 10, 12 positioned respectively on the entrance and exit sides of liquid crystal panel 11. For illustrative purpose, upper and lower sides are defined such that the side of liquid crystal panel 11 where flexible cable 11a is disposed will be referred to as an "upper side" and the opposite side as a "lower side".

Air-cooling unit 30a comprises cooling fan 28a and air-cooling duct 29a for guiding an air stream produced by cooling fan 28a to the liquid crystal unit. Air-cooling duct 29a has an end which is positioned below the liquid crystal unit and on which outlet port 34a is formed. The other end of air-cooling duct 29a houses cooling fan 28a therein. The air stream produced by cooling fan 28a flows through air-cooling duct 29a and is discharged out of the duct from outlet port 34a. Air stream 36a discharged from outlet port 34a flows from below through spaces between liquid crystal panel 11 and polarizer plates 10, 12 toward the center of liquid crystal panel 11.

Air-cooling unit 33a comprises cooling fan 31a and air-cooling duct 32a for guiding an air stream produced by cooling fan 31a to the liquid crystal unit. Air-cooling duct 32a has an end which is positioned above the liquid crystal unit and on which outlet port 35a is formed. The other end of air-cooling duct 32a houses cooling fan 31a therein. The air stream produced by cooling fan 31a flows through air-cooling duct 32a and is discharged out of the duct from outlet port 35a. Air stream 37a discharged from outlet port 35a flows from above through spaces between liquid crystal panel 11 and polarizer plates 10, 12 toward the center of liquid crystal panel 11.

As shown in FIG. 7B, outlet ports 34a, 35a are disposed such that their openings confront each other. The openings of outlet ports 34a, 35a are square in shape, for example. Outlet ports 34a, 35a have opening widths W1, W2 in a sectional plane parallel to the surface of liquid crystal panel 11. Opening width W2 of outlet port 35a is smaller than opening width W1 of outlet port 34a. The sizes of opening widths W1, W2 should desirably be set appropriately depending on the flow velocities (air velocities) and the flow rates (air rates) of air streams 36a, 37a. The ratio of opening width W1 and opening width W2 is 3:1, for example.

As viewed in a direction perpendicular to the surface of liquid crystal panel 11, the centers of the openings of outlet ports 34a, 35a along the sectional plane are positioned on a central axis A which passes through the center of liquid crystal panel 11. Desirably, as viewed in the direction perpendicular to the surface of liquid crystal panel 11, a first central axis extending perpendicularly to the opening of outlet port 34a and passing through an intermediate point on a line along the sectional plane in the opening of outlet port 34a is in alignment with a second central axis extending perpendicularly to the opening of outlet port 35a and passing through an intermediate point on a line along the sectional plane in the opening of outlet port 35a. In other words, the opening of outlet port 34a and the opening of outlet port 35a have their centers aligned with each other.

A cooling action of liquid crystal unit assembly 2 of the cooling device according to the present exemplary embodiment will be described below.

Air stream 36a discharged from outlet port 34a flows upwardly in the space between polarizer plate 10 and liquid crystal panel 11 and the space between liquid crystal panel 11 and polarizer plate 12. Air stream 37a discharged from outlet port 35a flows downwardly in the space between polarizer plate 10 and liquid crystal panel 11 and the space between liquid crystal panel 11 and polarizer 12.

As viewed in the direction perpendicular to the surface of liquid crystal panel 11, air stream 36a and air stream 37a impinges upon each other in the central regions of the spaces between liquid crystal panel 11 and polarizers 10, 12, producing an impinging jet. The impinging jet comprises a turbulent flow accompanying the generation/elimination of unsteady vortexes. As shown in FIG. 7C, the impinging jet includes swirling flows (vortexes) directed substantially perpendicularly to the surfaces of liquid crystal panel 11 and polarizers 10, 12. As the swirling flows (vortexes) are applied substantially perpendicularly to the surfaces of liquid crystal panel 11 and polarizers 10, 12, their cooling effect is stronger than if the air streams flow along the surfaces (laminar flows).

The cooling based on an impinging jet including swirling flows (vortexes) undergoes the three processes:

1) the breakage (peeling) of the thermal boundary layer on the surface;
2) the forced fluid exchange (temperature replacement) due to the generation/elimination of unsteady vortexes; and
3) the slippage on the wall surface of the jet due to the Coanda effect.

The fluid exchange (temperature replacement) means an exchange (temperature replacement) between a fluid near the surface of the heated body (high temperature) and a fluid spaced a little from the surface of the heated body (low temperature). The Coanda effect refers to the property of a fluid such that when an object is placed in a fluid flow, the pressure between the fluid and the solid wall surface of the object drops to attract the fluid flow to the wall surface, causing the fluid to flow along the solid wall surface of the object.

The cooling based on the above three processes provides a cooling ability which is five to ten times the cooling ability achieved when a fluid flows simply along a flat plate (laminar flow). The cooling device according to the present exemplary embodiment utilizes the above three processes to generate swirling flows directed perpendicularly to the light transmission surfaces of polarizer plates 10, 12 and liquid crystal panel 11, for thereby forming a jet perpendicular to the heated surfaces (light transmission surfaces) without blocking the transmission of color lights. It is thus possible to greatly increase the heat transfer coefficient compared with the structure wherein a fluid flows along parallel flat plates, with the result that the heat radiation efficiency can be improved in cooling the liquid crystal units.

Furthermore, inasmuch as the impinging jet acts to promote the heat radiation from the surfaces of liquid crystal panel 11 and polarizer plates 10, 12, the temperature of the fluid converted into the impinging jet rises owing to the heat energy discharged from the surfaces. Consequently, if the fluid stays between liquid crystal panel 10 and polarizer plate 11, for example, then since the temperature difference between the heated surface and the cooling air drops, a reduction in the heat transfer coefficient possibly results.

The cooling device according to the exemplary embodiment is able to lower a reduction in the heat transfer coefficient by efficiently discharging the heat-retaining fluid with the impinging jet.

The principles and advantages of the movement of the heat-retaining fluid with the impinging jet will specifically be described below.

Since opening width W1 of outlet port 34a is greater than opening width W2 of outlet port 35a, the width of upward air stream 36a is greater than the width of downward air stream 37a. Therefore, as shown in FIG. 7B, part of air stream 36a generates bypass flows 38 flowing along both sides of a region where it impinges upon air stream 37a to develop a pressure buildup (i.e., a region where the system impedance is high).

If air stream 36a and air stream 37a impinge upon each other over the center of the heated surfaces, then exhaust air (fluid) 39 heated to a high temperature by the heat transfer promoted by the swirling flows is carried on bypass flows 38 on both sides of the impinging region, and transported upwardly in the spaces between liquid crystal panel 11 and polarizer plates 10, 12. As exhaust air 39 is transported by bypass flows 38, exhaust air 39 does not flow back to the original cooling streams (air streams 36a, 37a flowing into the impinging region), but is discharged out of the liquid crystal units. In this manner, the cooling capability is further increased.

2nd Exemplary Embodiment

FIGS. 8A through 8C are views showing a cooling device according to a second exemplary embodiment of the present invention. FIG. 8A is a cross-sectional view of the overall structure of the cooling device, FIG. 8B is a partial enlarged view showing the manner in which air flows on the surface of a liquid crystal panel 11 of a liquid crystal unit as it is viewed in the direction in which light is applied to the liquid crystal panel, and FIG. 8C is a view showing the manner in which air flows on the liquid crystal panel of the liquid crystal unit as it is viewed in side elevation.

As shown in FIGS. 8A through 8C, the cooling device has two air-cooling units 30b, 33b and air baffle plate 41a. Air-cooling unit 30b comprises cooling fan 28b and air-cooling duct 29b having outlet port 34b. Air-cooling unit 33b comprises cooling fan 31b and air-cooling duct 32b having outlet port 35b. Cooling fans 28b, 31b and air-cooling ducts 29b, 32b are basically the same as those shown in FIGS. 7A through 7C except for the positional relationship between outlet ports 34b, 35b.

As shown in FIG. 8B, outlet ports 34b, 35b are disposed such that their openings confront each other. The openings of outlet ports 34b, 35b are square in shape, for example. Opening width W2 of outlet port 35b is smaller than opening width W1 of outlet port 34b. As viewed in the direction perpendicular to the surface of liquid crystal panel 11, the center of the opening of outlet ports 34b is positioned on the central axis A which passes through the center of liquid crystal panel 11, whereas the center of the opening of outlet ports 35b is positioned on the right side of the central axis A (the side opposite to the side where the cooling fans are located). Specifically, as viewed in the direction perpendicular to the surface of liquid crystal panel 11, the position of the central axis of outlet port 35b is shifted to the right from the central axis of outlet port 34b (or the central axis A of liquid crystal panel 11). In other words, the opening of outlet port 34b and the opening of outlet port 35b are not aligned with each other along the widths of the openings.

Air baffle plate 41a is integrally combined with holder 40 by which the liquid crystal unit (polarizer plate 10, liquid crystal panel 11, and polarizer plate 12) is secured in place. As viewed in the direction perpendicular to the surface of liquid crystal panel 11, air baffle plate 41a is disposed on the side to which the central axis of outlet port 35b is shifted, in confronting relation to the side edges of polarizer plate 10, liquid crystal panel 11, and polarizer plate 12. The clearances between the ends of polarizer plate 10, liquid crystal panel 11, and polarizer plate 12 and air baffle plate 41a are of such a size that the fluid is prevented from leaking from the spaces between liquid crystal panel 11 and polarizer plates 10, 12.

The flow path in air-cooling duct 29b is bent at a right angle at the end thereof where outlet port 34b is provided, and the distal end of the bent flow path serves as outlet port 34b. According to this flow path structure, the flow velocity (air velocity) of the air stream from cooling fan 28b as it progresses through the bent flow path is greater in an outer peripheral region than in an inner peripheral region. In other words, the flow velocity of air stream 36b in the opening of outlet port 34b has such a distribution in the direction along a sectional plane parallel to the surface of liquid crystal panel 11 that the flow velocity is progressively greater from one side to the other. Thus, air stream 36b discharged from outlet port 34b has such a flow velocity (air velocity) distribution that the velocity is greater in the outer peripheral region than in the inner peripheral region. According to the present exemplary embodiment, based on the flow velocity (air velocity) distribution, air stream 36b is divided into air stream 42a positioned in the outer peripheral region and air stream 43a positioned in the inner peripheral region. The flow velocity (air velocity) of air stream 42a is greater than the flow velocity (air velocity) of air stream 43a.

A cooling action of liquid crystal unit assembly 2 of the cooling device according to the present exemplary embodiment will be described below.

Air streams 42a, 43a discharged from outlet port 34b flow upwardly in the space between polarizer plate 10 and liquid crystal panel 11 and the space between liquid crystal panel 11 and polarizer 12. Air stream 37b discharged from outlet port 35b flows downwardly in the space between polarizer plate 10 and liquid crystal panel 11 and the space between liquid crystal panel 11 and polarizer 12.

As viewed in the direction perpendicular to the surface of liquid crystal panel 11, air stream 42a in the outer peripheral region which is discharged from outlet port 34b and air stream 37b which is discharged from outlet port 35b progress in an outer peripheral region which is positioned outwardly from the central axis of outlet port 34b (a region where air baffle plate 41a is disposed), and impinge upon each other in the central regions of the spaces between liquid crystal panel 11 and polarizers 10, 12, producing an impinging jet. Since the impinging jet contains swirling flows (vortexes) as described above with respect to the first exemplary embodiment, it provides a cooling capability based on the three processes referred to above. The momentum of air flows 37b, 42a should desirably be equal to each other.

After air streams 37b, 42a have impinged upon each other, flows directed toward the outer peripheral region within the plane of liquid crystal panel 11 and polarizers 10, 12 are limited by air baffle plate 41a. Therefore, the major flow comprises a flow that is directed remotely from air baffle plate 41a (a flow directed toward the center of the liquid crystal panel). This flow is referred to as "impinge-combined flow 44a".

In the inner peripheral region over the heated surfaces of liquid crystal unit assembly 2, which is located inwardly of the central axis of outlet port 34b (or the central axis A of the liquid crystal panel), impinge-combined flow 44a impinges upon air stream 43a in the inner peripheral region which is discharged from outlet port 34b, producing an impinging jet. As the impinging jet contains swirling flows (vortexes) as described above with respect to the first exemplary embodiment, it provides a cooling capability based on the three processes referred to above.

Impinge-combined flow 44a impinges upon air stream 43a substantially at a right angle. Therefore, when impinge-combined flow 44a impinges upon air stream 43a, a flow (impinge-combined flow 45a) directed upwardly to the left on the sheet of FIG. 8B is generated within the plane of liquid crystal panel 11 and polarizers 10, 12. The air which is repeatedly heated to a high temperature does not flow back to the cooling system, but is discharged out of the liquid crystal unit assembly.

According to the cooling device of the present exemplary embodiment, since air streams (air flows) having different flow velocities (air velocities) vectors impinge upon each other in the two outer and inner peripheral regions on the light transmission surfaces of the components (polarizer plate 10, liquid crystal panel 11, and polarizer plate 12) of the liquid crystal unit assembly, a highly turbulent flow field is created in a wide range over the heated surfaces. Therefore, the liquid crystal units can be cooled more effectively.

Since the liquid crystal panels have a highly temperature-dependent optical modulating capability for modulating the input signals, if the temperature distribution of the panel surface is irregular, then the liquid crystal panels tend to cause luminance irregularities and color irregularities, resulting in a reduction in the image quality. However, since the cooling device according to the present exemplary embodiment can create a highly turbulent flow field in a wide range over the heated surfaces, the in-plane temperature distribution of the liquid crystal panels is rendered uniform, thus solving the problems of luminance irregularities and color irregularities.

As viewed in the direction perpendicular to the surface of liquid crystal panel 11, impinge-combined flow 45a created by the second impinge in the inner peripheral region is discharged out of liquid crystal unit assembly 2 (upwardly to the left in FIG. 8B) from the side (inner peripheral side) which is opposite to the side where air baffle plate 41a is disposed. When impinge-combined flow 45a is discharged, it passes through a minimum required region of the region that needs to be cooled (the light transmittance surfaces), and does not flow back to the cooling system. Thus, the exhaust air that is of a high temperature does not flow back to the cooling system, but is effectively removed.

3rd Exemplary Embodiment

Figure 9A:
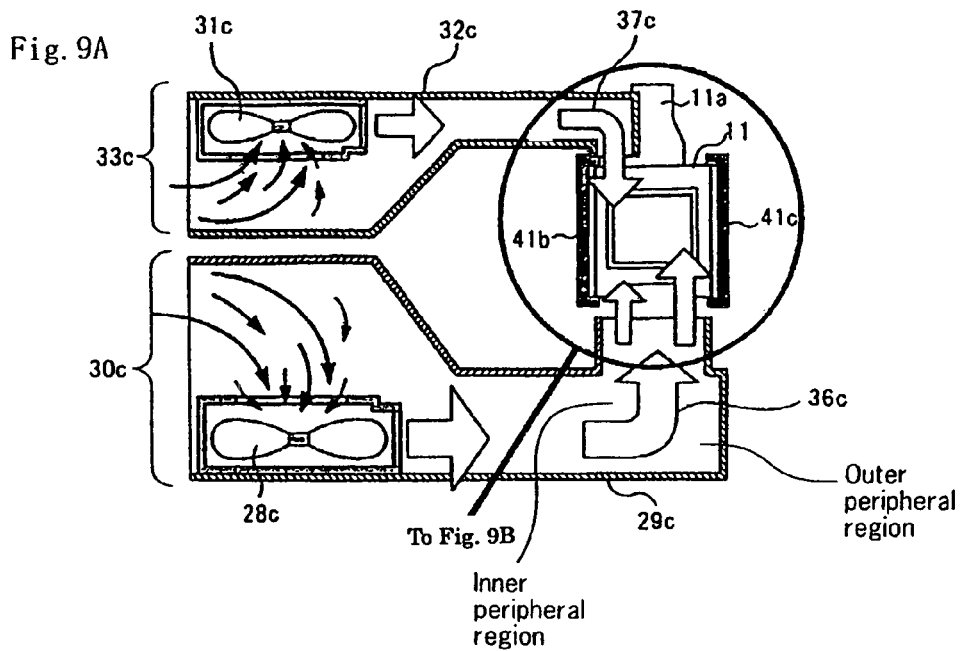
FIG. 9A is a cross-sectional view of the overall structure of a cooling device according to a third exemplary embodiment of the present invention.
Figure 9B:
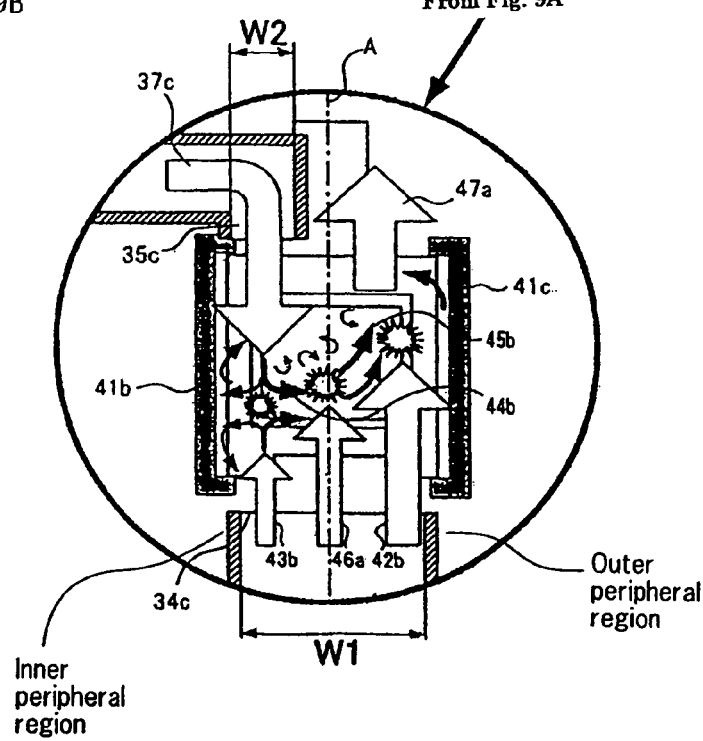
FIG. 9B is a partial enlarged view showing the manner in which air flows on the surface of a liquid crystal panel 11 of a liquid crystal unit in the cooling device shown in FIG. 9A as it is viewed in the direction in which light is applied to the liquid crystal panel.
Figure 9C:
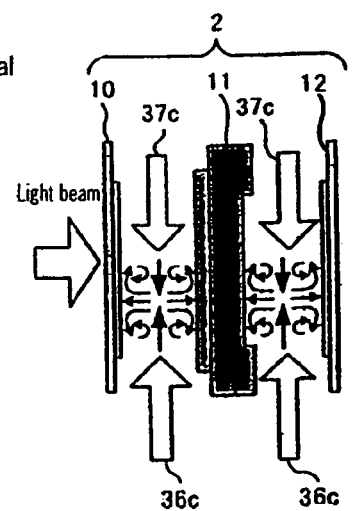
FIG. 9C is a view showing the manner in which air flows on the liquid crystal panel 11 of the liquid crystal unit shown in FIG. 9B as it is viewed in side elevation.

FIGS. 9A through 9C are views showing a cooling device according to a third exemplary embodiment of the present invention. FIG. 9A is a cross-sectional view of the overall structure of the cooling device, FIG. 9B is a partial enlarged view showing the manner in which air flows on the surface of a liquid crystal panel 11 of a liquid crystal unit as it is viewed in the direction in which light is applied to the liquid crystal panel, and FIG. 9C is a view showing the manner in which air flows on the liquid crystal panel of the liquid crystal unit as it is viewed in side elevation.

As shown in FIGS. 9A through 9C, the cooling device has two air-cooling units 30c, 33c and two air baffle plates 41b, 41c. Air-cooling unit 30c comprises cooling fan 28c and air-cooling duct 29c having outlet port 34c. Air-cooling unit 33c comprises cooling fan 31c and air-cooling duct 32c having outlet port 35c. Cooling fans 28c, 31c and air-cooling ducts 29c, 32c are basically the same as those shown in FIGS. 7A through 7C except for the positional relationship between outlet ports 34c, 35c.

As shown in FIG. 9B, outlet ports 34c, 35c are disposed such that their openings confront each other. The openings of outlet ports 34c, 35c are square in shape, for example. Opening width W2 of outlet port 35c is smaller than opening width W1 of outlet port 34c. As viewed in the direction perpendicular to the surface of liquid crystal panel 11, the center of the opening of outlet ports 34c is positioned on the central axis A which passes through the center of liquid crystal panel 11, whereas the center of the opening of outlet ports 35c is positioned on the left side of the central axis A (the side where the cooling fans are located). Specifically, as viewed in the direction perpendicular to the surface of liquid crystal panel 11, the position of the central axis of outlet port 35c is shifted to the left from the central axis of outlet port 34c (or the central axis A of liquid crystal panel 11).

Air baffle plates 41b, 41c are integrally combined with a holder by which the liquid crystal unit (polarizer plate 10, liquid crystal panel 11, and polarizer plate 12) is secured in place. As viewed in the direction perpendicular to the surface of liquid crystal panel 11, air baffle plate 41b is disposed on the side to which the central axis of outlet port 35c is shifted, and air baffle plate 41c is disposed opposite to air baffle plate 41b. Air baffle plates 41b, 41c are disposed in confronting relation to each other. The plane of the surfaces of air baffle plates 41b, 41c extend transversely to (or perpendicularly to) the plane of the surfaces of polarizer plate 10, liquid crystal panel 11, and polarizer plate 12. The clearances between the ends of polarizer plate 10, liquid crystal panel 11, and polarizer plate 12 and air baffle plates 41b, 41c are of such a size that the fluid is prevented from leaking from the spaces between liquid crystal panel 11 and polarizer plates 10, 12.

Air-cooling duct 29c is of a bent structure identical to that according to the second exemplary embodiment. Therefore, air stream 36c discharged from outlet port 34c has such a flow velocity (air velocity) distribution, as viewed in the direction perpendicular to the surface of liquid crystal panel 11, that the velocity is greater in the outer peripheral region than in the inner peripheral region. According to the present exemplary embodiment, based on the flow velocity (air velocity) distribution, air stream 36c is divided into air stream 42b positioned in the outermost peripheral region, air stream 43b positioned in the innermost peripheral region, and air stream 46a positioned intermediate between air streams 42b, 43b. The flow velocity (air velocity) of air stream 42b is greater than the flow velocity (air velocity) of air stream 46a. The flow velocity (air velocity) of air stream 46a is greater than the flow velocity (air velocity) of air stream 43b.

A cooling action of liquid crystal unit assembly 2 of the cooling device according to the present exemplary embodiment will be described below.

Air streams 42b, 43b, 46a discharged from outlet port 34c flow upwardly in the space between polarizer plate 10 and liquid crystal panel 11 and the space between liquid crystal panel 11 and polarizer 12. Air stream 37c discharged from outlet port 35c flows downwardly in the space between polarizer plate 10 and liquid crystal panel 11 and the space between liquid crystal panel 11 and polarizer 12.

As viewed in the direction perpendicular to the surface of liquid crystal panel 11, air stream 43b in the innermost peripheral region which is discharged from outlet port 34c and air stream 37c which is discharged from outlet port 35c pass in an inner peripheral region which is positioned inwardly from the central axis of outlet port 34c (a region where air baffle plate 41b is disposed), and impinge upon each other, producing an impinging jet. Since the impinging jet contains swirling flows (vortexes) as described above with respect to the first exemplary embodiment, it provides a cooling capability based on the three processes referred to above. The momentum of air flow 37c is greater than the momentum of air low 43b, the position where air stream 37c and air stream 43b impinge upon each other is close to a region over the heated surfaces of liquid crystal unit assembly 2 where outlet port 34c is disposed.

After air streams 37c, 43b have impinged upon each other, flows directed toward the inner peripheral region within the plane of the heated surfaces are limited by air baffle plate 41b. Therefore, the major flow comprises a flow that is directed remotely from air baffle plate 41b (a flow directed toward the center of the liquid crystal panel). This flow is referred to as "impinge-combined flow 44b".

In the vicinity of the central region over the heated surfaces of liquid crystal unit assembly 2, impinge-combined flow 44b impinges upon air stream 46a which is discharged from outlet port 34c, producing an impinging jet. As the impinging jet contains swirling flows (vortexes) as described above with respect to the first exemplary embodiment, it provides a cooling capability based on the three processes referred to above.

Impinge-combined flow 44b impinges upon air stream 46a substantially at a right angle. Therefore, when impinge-combined flow 44b impinges upon air stream 46a, a flow (impinge-combined flow 45b) directed to the outer peripheral region is generated within the plane of liquid crystal panel 11 and polarizers 10, 12. A turbulent component is added to impinge-combined flow 45b to promote the heat transfer.

In a region outward of the central axis of outlet port 34c (or the central axis A of the liquid crystal panel) over the heated surfaces of liquid crystal unit assembly 2, impinge-combined flow 45b impinges upon air stream 42b in the outermost peripheral region which is discharged from outlet port 34c, at a sharp angle, producing an impinging jet. As the impinging jet also contains swirling flows (vortexes) as described above with respect to the first exemplary embodiment, it provides a cooling capability based on the three processes referred to above.

When impinge-combined flow 45b and air stream 42b impinge upon each other, they generate an in-plane flow directed outwardly. The outwardly directed in-plane flow has its direction limited by air baffle plate 41c disposed in the outer peripheral region, and is discharged out of liquid crystal unit assembly 2 as air stream 47a directed into a space above liquid crystal unit assembly 2 adjacent to air-cooling duct 32c.

According to the cooling device of the present exemplary embodiment, since air streams (air flows) having different flow velocities (air velocities) vectors impinge upon each other in the three outer and inner peripheral regions and the intermediate region on the light transmission surfaces of the components (polarizer plate 10, liquid crystal panel 11, and polarizer plate 12) of the liquid crystal unit assembly, a highly turbulent flow field is created in a wide range over the heated surfaces. Therefore, the liquid crystal units can be cooled more effectively.

As the cooling device according to the present exemplary embodiment can create a highly turbulent flow field in a wide range over the heated surfaces, the in-plane temperature distribution of the liquid crystal panels is rendered uniform, thus solving the problems of luminance irregularities and color irregularities.

Impinge-combined flow 47a created by the third impinge passes through the minimum required region of the region that needs to be cooled (the light transmittance surfaces), and does not flow back to the cooling system. Thus, the exhaust air that is of a high temperature does not flow back to the cooling system, but is effectively removed.

In the present exemplary embodiment, air stream 36c is divided into three air streams 42b, 43b, 46a, and the cooling action is performed by first, second, and third discrete air stream impinges. Actually, over the heated surfaces, the angle at which the air streams impinge upon each other varies progressively according to the flow velocity (air velocity) distribution of air stream 36c, causing the air stream to impinge continuously upon each other (linear impinge). The linear impinge is capable of creating a highly turbulent flow field in a wide range over the light transmission surfaces (the heated surfaces).

4th Exemplary Embodiment

Figure 10:
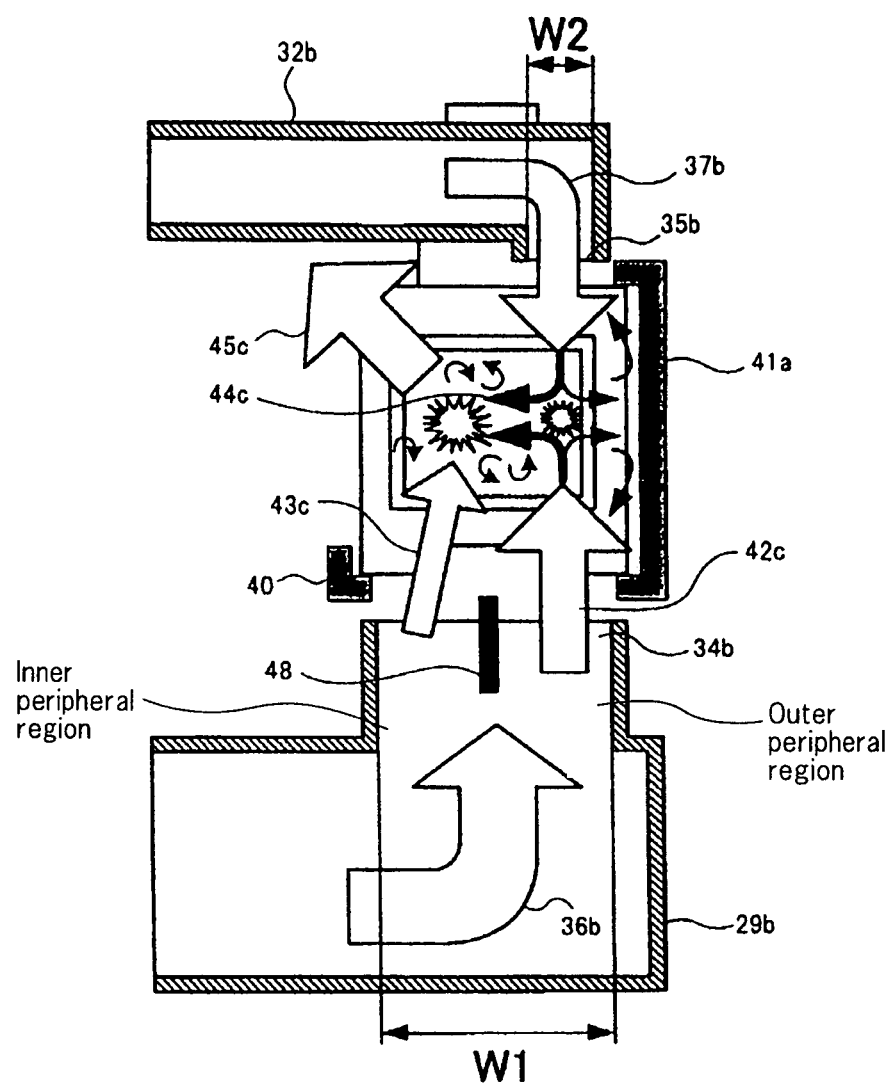
FIG. 10 is a partial enlarged view of a cooling device according to a fourth exemplary embodiment of the present invention.

FIG. 10 is a partial enlarged view of a cooling device according to a fourth exemplary embodiment of the present invention. FIG. 10 shows the manner in which air flows over the surface of the liquid crystal panel of a liquid crystal unit as it is viewed in the direction in which light is applied to the liquid crystal panel.

As shown in FIG. 10, the cooling device is similar to the cooling device shown in FIGS. 8A through 8C except that rib 48 is disposed in outlet port 34b of air-cooling duct 29b for adjusting the flow rate (air rate) ratio and discharged directions (air flow directions) of the air stream in the outer peripheral region and the air stream in the inner peripheral region. Those parts shown in FIG. 10 which are identical to those shown in FIGS. 8A through 8C are denoted by identical reference characters, and will not be described below to avoid redundant descriptions.

Rib 48 is a plate-like member and is disposed in outlet port 34b perpendicularly to the opening thereof. As viewed in the direction perpendicular to the surface of liquid crystal panel 11, rib 48 extends along the central axis of outlet port 34b, and divides air stream 36b flowing in air-cooling duct 29b into air stream 42c in the outer peripheral region and air stream 43c in the inner peripheral region. The flow rate (air rate) ratio of air stream 42c and air stream 43c is determined by the ratio of the area of the opening through which air stream 42c is discharged and the area of the opening through which air stream 43c is discharged. The discharged directions (air flow directions) of air stream 42c and air stream 43c are determined by the angle of rib 48 with respect to the opening.

When rib 48 changes the air rate ratio and the air flow directions of air stream 42c in the outer peripheral region and air stream 43c in the inner peripheral region, the position where air stream 42c in the outer peripheral region and air stream 43c in the inner peripheral region impinge upon each other and the strength (flow velocity, flow rate, or air force) of a turbulent flow generated by the impinge are adjusted. Furthermore, the position where impinge-combined flow 44c that is produced by the impinging of air stream 42c and air stream 37b and air stream 43c in the inner peripheral region impinge upon each other, the angle at which they impinge upon each other, and the strength of a turbulent flow generated by the impinge are also adjusted.

The cooling device according to the present exemplary embodiment offers, in addition to the advantages described above with respect to the second exemplary embodiment, the following advantages due to rib 48.

Since the impinging position and the turbulent flow strength can be adjusted when rib 48 changes the air rate ratio and the air flow directions of air stream 42c in the outer peripheral region and air stream 43c in the inner peripheral region, the cooling capability and the heat radiating region can be controlled depending on the heated characteristics of the liquid crystal panels and the polarizer plates.

5th Exemplary Embodiment

Figure 11:
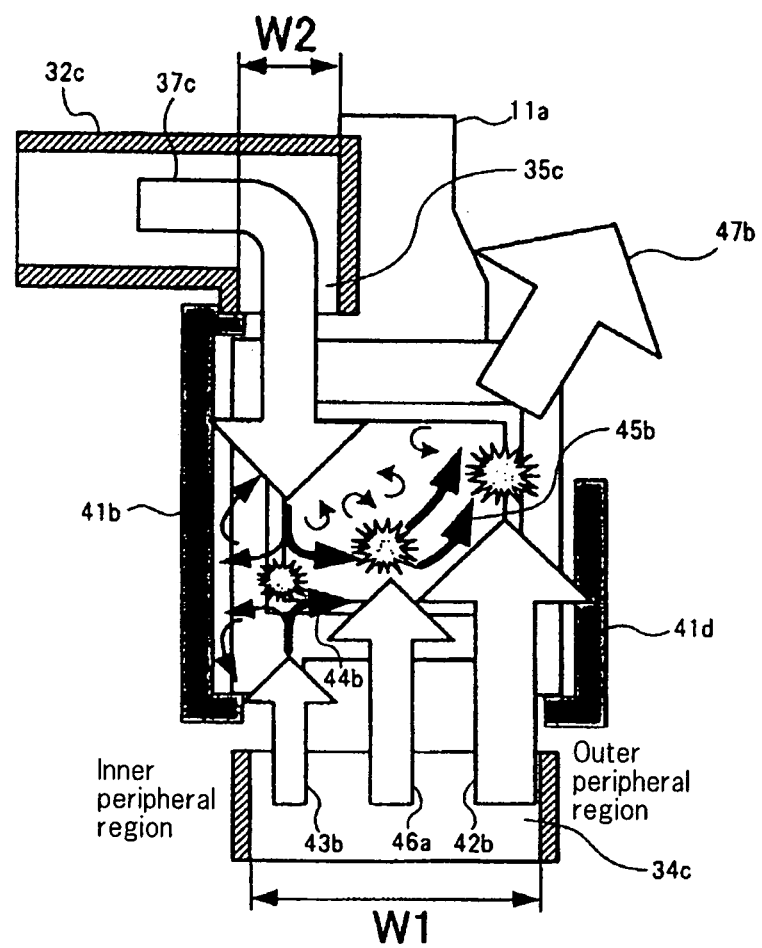
FIG. 11 is a partial enlarged view of a cooling device according to a fifth exemplary embodiment of the present invention.

FIG. 11 is a partial enlarged view of a cooling device according to a fifth exemplary embodiment of the present invention. FIG. 11 shows the manner in which air flows over the surface of the liquid crystal panel of a liquid crystal unit as it is viewed in the direction in which light is applied to the liquid crystal panel.

As shown in FIG. 11, the cooling device is similar to the cooling device shown in FIGS. 9A through 9C except that air baffle plate 41d is provided in place of air baffle plate 41c. Those parts shown in FIG. 11 which are identical to those shown in FIGS. 9A through 9C are denoted by identical reference characters, and will not be described below to avoid redundant descriptions.

Air baffle plate 41d, which is disposed in the outer peripheral region in confronting relation to air baffle plate 41b, is shorter than air baffle plate 41b. As viewed in the direction perpendicular to the surface of liquid crystal panel 11 (as shown in FIG. 11), the outer end of liquid crystal panel 11 confronts air baffle plate 41d in a range which extends from the lower end to the center of liquid crystal panel 11. Specifically, a region above the outer end of liquid crystal panel 11

(where flexible cable 11a is provided) is an open space as there is no air baffle plate therein.

With the cooling device according to the present exemplary embodiment, a linear impinge similar to the linear impinge according to the third exemplary embodiment occurs over the heated surfaces. Impinge-combined flow 47b produced by the linear impinge (which corresponds to impinge-combined flow 47a shown in FIG. 9B) is discharged into a space above liquid crystal unit assembly 2 adjacent to air-cooling duct 32c. Since the length of air baffle plate 41d is reduced, impinge-combined flow 47b is not limited by the flow controlled by air baffle plate 41d. Therefore, as viewed in the direction perpendicular to the surface of liquid crystal panel 11, impinge-combined flow 47b is discharged upwardly obliquely to the right.

The cooling device according to the present exemplary embodiment offers, in addition to the advantages described above with respect to the third exemplary embodiment, the following advantages due to the asymmetrical structures (structures having different lengths) of the pair of air baffle plates in the outer and inner peripheral regions.

If air-cooling unit 33c according to the third exemplary embodiment is unable to produce a sufficient rate of air flow, then it is necessary to increase opening width W2 of outlet port 35c. As shown in FIGS. 9A through 9C, with the pair of air baffle plates 41b, 41c in the outer and inner peripheral regions being of symmetrical structures, if opening width W2 of outlet port 35c is increased, the space (open space) between outlet port 35c and air baffle plate 41c in the outer peripheral region above liquid crystal unit assembly 2 is narrowed. Accordingly, the impinge-combined flow produced by the linear impinge over the heated surfaces is discharged with reduced efficiency into the space above liquid crystal unit assembly 2.

The length of air baffle plate 41d is smaller than the length of air baffle plate 41b in a cross section parallel to the plane of liquid crystal panel 11. In other words, the range in which air baffle plate 41d limits the direction of the combined flow extends from the lower portion to center of liquid crystal panel 11. As the space (open space) between outlet port 35c and air baffle plate 41c in the outer peripheral region above liquid crystal unit assembly 2 is greater than with the structure shown in FIGS. 9A through 9C, the space for discharging the fluid heated to a high temperature by the heat transfer promoted by the swirling flows can be increased in the structure with increased opening width W2 of outlet port 35c.

The cooling devices according to the exemplary embodiments described above are by way of example, and their structures may be modified appropriately within the scope of the present invention.

For example, in the cooling device according to the first exemplary embodiment shown in FIGS. 7A through 7C, a rib may be provided in outlet port 34a for dividing air stream 36c into bypass flows 38 and an air flow which flows centrally therebetween.

Air baffle plates may be disposed on both sides of liquid crystal panel 11 in sandwiching relation to liquid crystal panel 11.

When bypass flows can be generated, a central axis which passes through the center of outlet port 34a may be positionally different from a central axis which passes through the center of outlet port 35a.

Though outlet ports 34a, 35a are positioned respectively at the lower and upper ends of the liquid crystal unit, they are not limited to such a layout. Outlet ports 34a, 35a may confront each other in sandwiching relation to the liquid crystal unit insofar as they are disposed in confronting relation to each other.

The present invention is generally applicable to liquid crystal projectors having liquid crystal units, and also to electronic apparatus having members juxtaposed such that a plurality of surfaces thereof including at least one heat radiating surface are disposed in confronting relation to each other. The electronic apparatus to which the present invention is applicable may include a rack unit having a plurality of printed-circuit boards mounted in juxtaposition and a small-size electronic apparatus with IC chip boards mounted in a casing.

According to the first through fifth exemplary embodiments, one liquid crystal unit is to be cooled. However, the present invention is not limited to such an application. Instead, a plurality of liquid crystal units may be cooled. If a plurality of liquid crystal units may be cooled, then the outlet port of one of the air-cooling ducts and the outlet port of the other air-cooling duct confront each other in sandwiching relation to each of the liquid crystal units. One of the air-cooling ducts may be shared by the liquid crystal units. Similarly, the other air-cooling duct may be shared by the liquid crystal units.

The liquid crystal unit may comprise a liquid crystal panel and optical devices disposed respectively on the entrance and exit sides of the liquid crystal panel. Each of the optical devices may comprise a polarizer plate, an optical compensation plate, or a combination thereof, or may include another optical element in addition to the polarizer plate and the optical compensation plate.

Figure 1A:
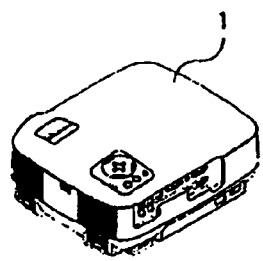
FIG. 1A is a perspective view of a liquid crystal projector 1 according to the related art of the present invention.
Figure 1B:
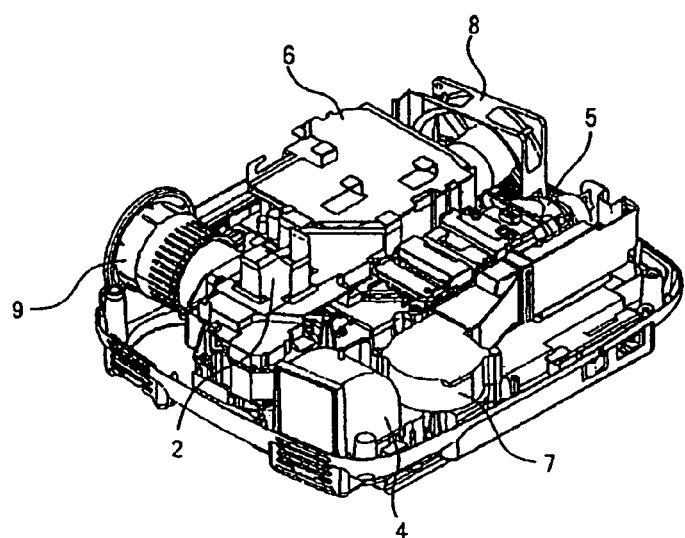
FIG. 1B is a perspective view showing internal structural details of the liquid crystal projector 1 shown in FIG. 1A.
Figure 1C:
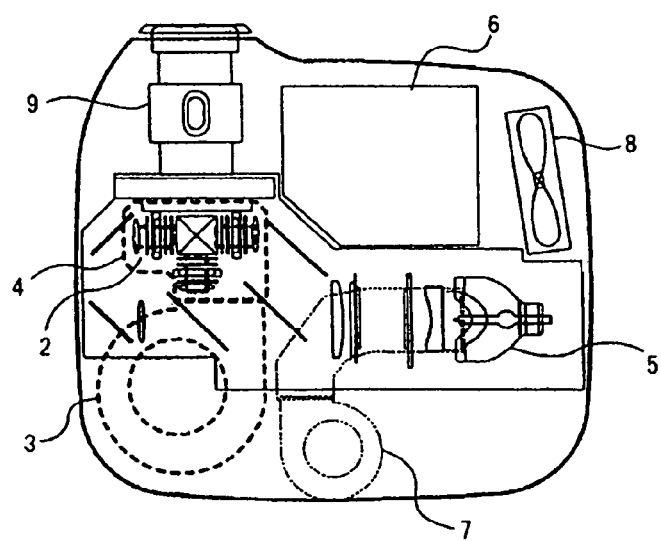
FIG. 1C is a view showing the layout of components of the liquid crystal projector 1 shown in FIG. 1A.
Figure 2A:
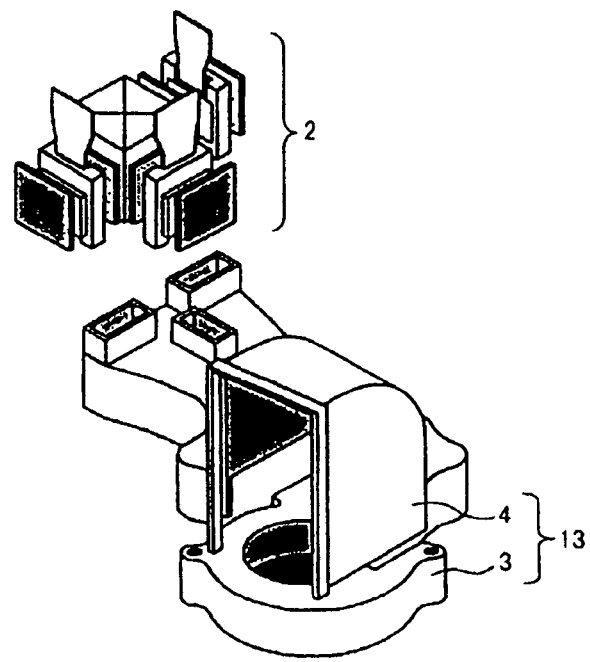
FIG. 2A is an exploded perspective view of a cooling device 13 for cooling liquid crystal units of the liquid crystal projector shown in FIG. 1A.
Figure 2B:
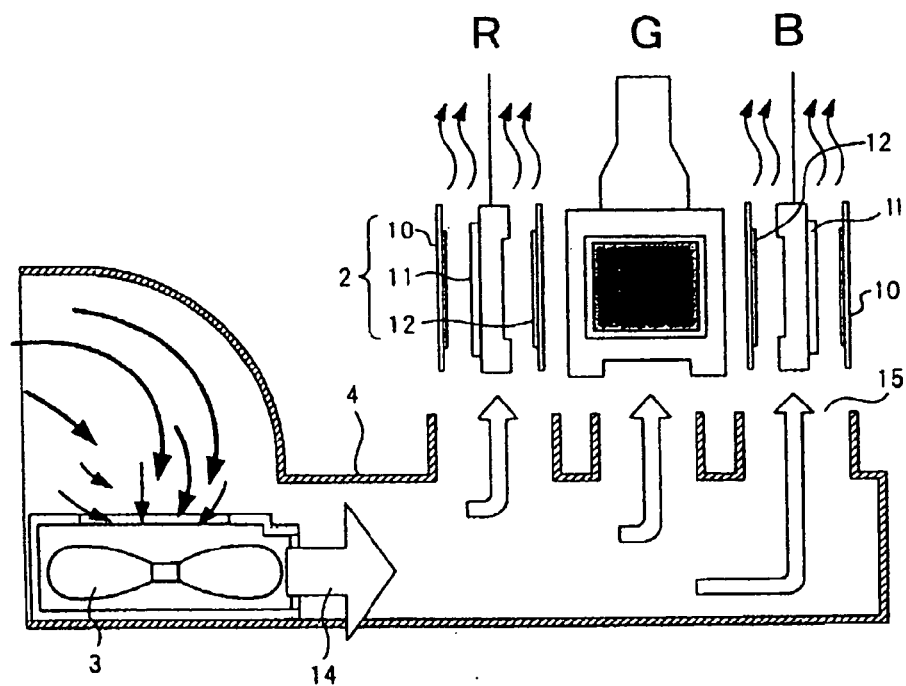
FIG. 2B is a cross-sectional view illustrative of a cooling action of the cooling device 13 shown in FIG. 2A.
Figure 3:
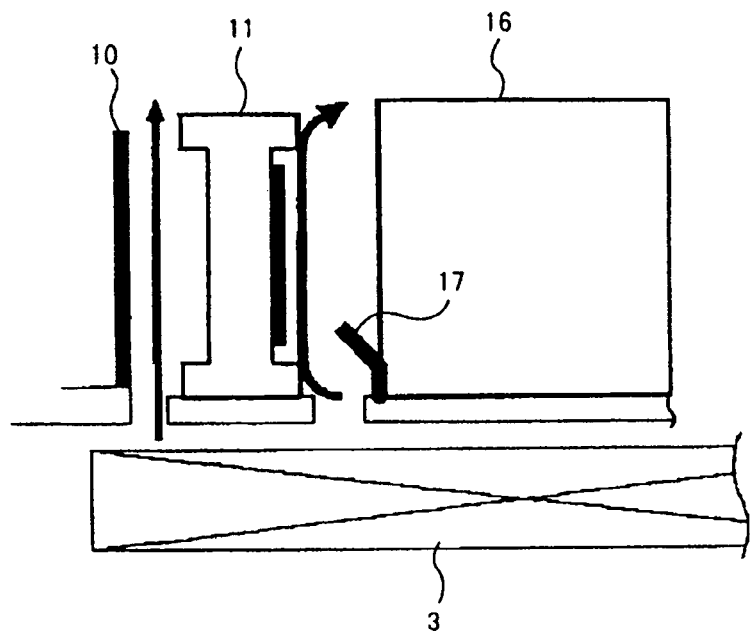
FIG. 3 is a view showing structural details of a cooling device disclosed in JP-A No. 11-295814.
Figure 4:
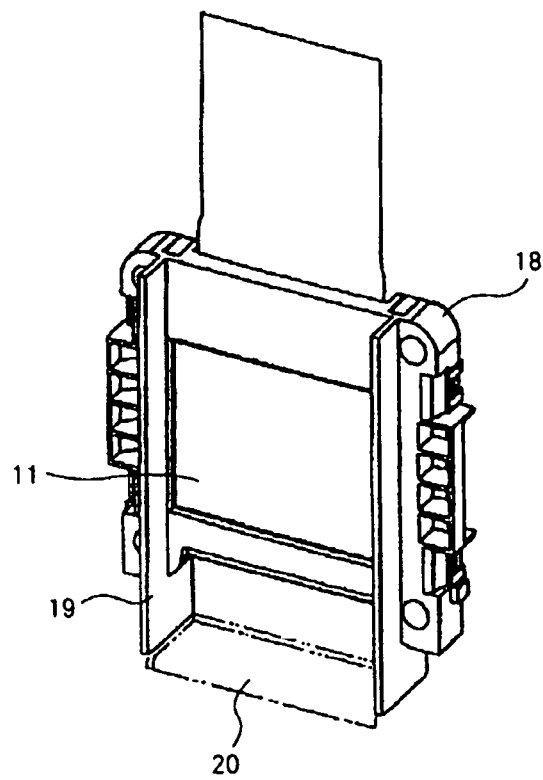
FIG. 4 is a view showing structural details of a cooling device disclosed in JP-A No. 2001-318361.
Figure 5A:
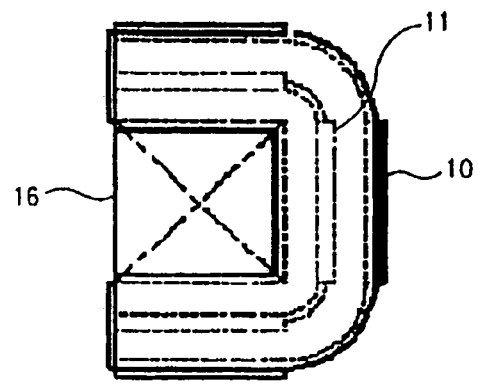
FIG. 5A is a plan view of a cooling device disclosed in JP-A No. 2000-124649.
Figure 5B:
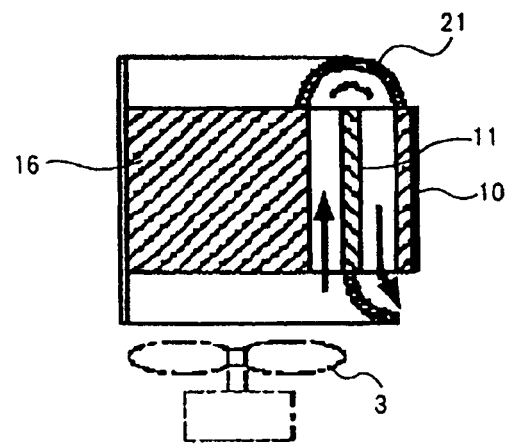
FIG. 5B is a side elevational view of the cooling device disclosed in JP-A No. 2000-124649.
Figure 6A:
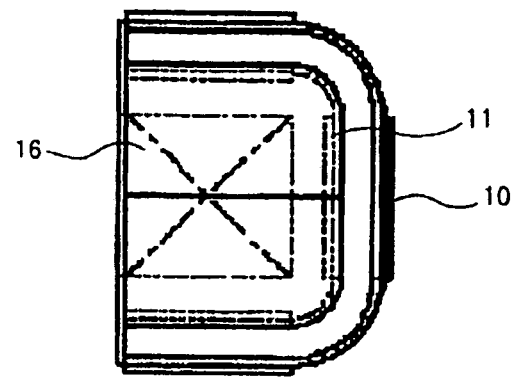
FIG. 6A is a plan view of another cooling device disclosed in JP-A No. 2000-124649.
Figure 6B:
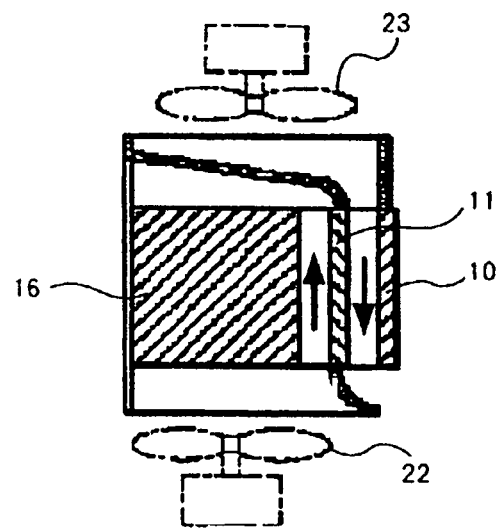
FIG. 6B is a side elevational view of the other cooling device disclosed in JP-A No. 2000-124649.

A liquid crystal projector including a plurality of liquid crystal units to which the present invention is applicable may be the liquid crystal projector shown in FIGS. 1A through 1C, for example. In the liquid crystal projector, the outlet ports of ducts disposed above the liquid crystal units and the outlet ports of ducts disposed below the liquid crystal units are of the structure described with respect to either one of the first through fifth exemplary embodiments. The liquid crystal projector thus constructed has an excellent cooling capability.

A cooling device according to an aspect of the present invention is a cooling device for an electronic apparatus including a plurality of members juxtaposed such that surfaces thereof confront each other, at least one of the members including a heat radiating surface, the cooling device comprising a first air-cooling member which includes a first outlet port that creates a first air stream to flow along the heat radiating surface, and a second air-cooling member which includes a second outlet port that creates a second air stream to flow along the heat radiating surface in a direction different from the first air stream, the first and second outlet ports having different opening widths in a sectional plane parallel to the heat radiating surface.

A liquid crystal projector according to another aspect of the present invention comprises a liquid crystal panel, a first optical device disposed on an entrance side of the liquid crystal panel, a second optical device disposed on an exit side of the liquid crystal panel, a first air-cooling member which includes a first outlet port that creates a first air stream to flow along confronting surfaces of the liquid crystal panel and the first and second optical devices, and a second air-cooling member which includes a second outlet port that creates a second air stream to flow along the confronting surfaces in a direction different from the first air stream, the first and second outlet ports having different opening widths in a sectional plane parallel to the surfaces of the liquid crystal panel.

According to the above aspects, when the first air stream and the second air stream impinge upon each other over the heat radiating surface, an impinging jet including swirling flows (vortexes) directed perpendicularly to the heat radiating surface is created. The impinging jet peels off a thermal boundary layer produced on the heat radiating surface, promoting fluid temperature replacement to improve a heat transfer coefficient for a sufficient cooling capability.

Since the opening widths of the first and second outlet ports in the sectional plane parallel to the heat radiating surface are different from each other, part of the air stream from the outlet port with the larger opening width produces bypass flows flowing along both sides of a region where the impinging jet is created. Therefore, the exhaust air heated to a high temperature does not flow back to the cooling system, but is effectively discharged out of the liquid crystal unit assembly. The cooling capability can thus be further improved.

According to another means, an air baffle plate disposed on a side of the liquid crystal unit assembly controls the direction of a combined flow generated by the impinging of the upward and downward air streams so as to impinge perpendicularly upon a remaining air flow, which is not used in the first impinge, of the air flowing from the outlet port with the larger opening width. Consequently, the region wherein the impinge jet is created is spread over the entire heated surface for a higher heat radiating effect, and temperature irregularities in the plane of the panel are eliminated to improve the image quality.

This application is based upon and claims the benefit of priority from Japanese Patent Application No. 2007-254432 filed in Japan Patent Office on Sep. 28, 2007, the contents of which are hereby incorporated by reference.

While exemplary embodiments of the present invention have been described using specific terms, such description is for illustrative purposes only, and it is to be understood that changes and variations may be made without departing from the spirit or scope of the following claims.

What is claimed is:

1. A cooling device for an electronic apparatus including a plurality of members juxtaposed such that surfaces thereof confront each other, at least one of the members including a panel comprising a planar heat radiating surface, said cooling device comprising:
   a first air-cooling member which includes a first outlet port that is formed adjacent to a first end of the panel and substantially perpendicular to the panel, such that the first outlet port creates a first air stream to flow along said planar heat radiating surface at the first end of the panel; and
   a second air-cooling member which includes a second outlet port that is formed adjacent to a second end of the panel and substantially perpendicular to the panel, such that the second outlet port creates a second air stream to flow along said planar heat radiating surface in a direction different from the first air stream at the second end of the panel;
   wherein said first outlet port and said second outlet port have different opening widths in a sectional plane parallel to said planar heat radiating surface, and the first outlet port and the second outlet port are provided on a plane that includes the sectional plane,
   wherein the first air stream impinges upon the second air stream on the planar heat radiating surface between the first and second ends of the panel, and
   wherein the first air stream impinges upon the second air stream at a central portion of the panel.

2. A cooling device for an electronic apparatus according to claim 1, wherein said first outlet port and said second outlet port are disposed in confronting relation to each other with said members interposed therebetween.

3. A cooling device for an electronic apparatus according to claim 2, wherein as viewed in a direction perpendicular to said planar heat radiating surface, a first central axis extending perpendicularly to the opening of said first outlet port and passing through an intermediate point on a line along said sectional plane in the opening of said first outlet port is in alignment with a second central axis extending perpendicularly to the opening of said second outlet port and passing through an intermediate point on a line along said sectional plane in the opening of said second outlet port.

4. A cooling device for an electronic apparatus according to claim 2, wherein as viewed in a direction perpendicular to said heat radiating surface, a first central axis extending perpendicularly to the opening of said first outlet port and passing through an intermediate point on a line along said sectional plane in the opening of said first outlet port is positionally different from a second central axis extending perpendicularly to the opening of said second outlet port and passing through an intermediate point on a line along said sectional plane in the opening of said second outlet port.

5. A cooling device for an electronic apparatus according to claim 1, wherein said members include:
   a liquid crystal panel;
   a first optical device disposed on an entrance side of said liquid crystal panel; and
   a second optical device disposed on an exit side of said liquid crystal panel;
   said first outlet port and said second outlet port being directed toward respective opposite ends of said liquid crystal panel.

6. A cooling device for an electronic apparatus according to claim 5, wherein each of said first optical device and said second optical device comprises a polarizer plate, an optical compensation plate, or a combination thereof.

7. A cooling device for an electronic apparatus according to claim 5, wherein said liquid crystal panel includes a first end on which a flexible cable for supplying a drive signal is mounted, said first outlet port is directed toward a second end of said liquid crystal panel which is opposite to said first end, and said second outlet port is directed toward said first end of said liquid crystal panel.

8. A cooling device for an electronic apparatus according to claim 1, wherein the impinging of the first and second air stream produces an impinging jet.

9. A cooling device for an electronic apparatus according to claim 8, wherein the impinging jet comprises a turbulent air flow.

10. A cooling device for an electronic apparatus according to claim 8, wherein the impinging jet produces swirling air flows which are applied substantially perpendicularly to the planar heat radiating surface.

11. The cooling device of claim 1, wherein the plurality of members further comprise:
   a first polarizer plate formed on a first side of the panel; and
   a second polarizer plate formed on a second side of the panel,
   wherein the first outlet port directs the first air stream between the first polarizer plate and the first side of the panel and between the second polarizer plate and the second side of the panel, and
   wherein the second outlet port directs the second air stream between the first polarizer plate and the first side of the panel and between the second polarizer plate and the second side of the panel.

12. The cooling device of claim 11, wherein the first air stream impinges upon the second air stream in a first space formed between the first polarizer plate and the first side of the panel, and in a second space formed between the second polarizer plate and the second side of the panel.

13. The cooling device of claim 11, wherein as viewed in a direction perpendicular to the planar heat radiating surface of the panel, a center of the first outlet port and a center of the second outlet port along the sectional plane are positioned on a central axis which passes through the central portion of the panel.

14. The cooling device of claim 11, wherein the impinging of the first air stream upon the second air stream produces a first impinging jet in the first space at the central portion of the panel, and produces a second impinging jet in the second space at the central portion of the panel, and
wherein the first and second impinging jets comprise a turbulent flow accompanying a generation and elimination of unsteady vortexes.

15. The cooling device of claim 14, wherein the unsteady vortexes of the first impinging jet are directed substantially perpendicularly to the first polarizer plate and the first side of the panel, and the unsteady vortexes of the second impinging jet are directed substantially perpendicularly to the second polarizer plate and the second side of the panel.

16. The cooling device of claim 14, wherein a width of the first air stream is greater than the width of the second air stream, such that a part of the first air stream generates a bypass flow flowing along a side of a region where the first air stream impinges upon the second air stream to develop a region of high flow path resistance, and
wherein exhaust air heated to a high temperature by heat transfer promoted by turbulent flow is carried on the bypass flow and transported in a direction of the first air stream in the first and second spaces between the panel and the first and second polarizer plates.

17. The cooling device of claim 16, wherein the exhaust air is transported by the bypass flows and does not flow back to the first and second air streams and is discharged out of the first and second spaces.

18. A liquid crystal projector comprising:
a liquid crystal panel;
a first optical device disposed on an entrance side of said liquid crystal panel;
a second optical device disposed on an exit side of said liquid crystal panel;
a first air-cooling member which includes a first outlet port that creates a first air stream to flow along confronting surfaces of said liquid crystal panel and the first and second optical devices; and
a second air-cooling member which includes a second outlet port that creates a second air stream to flow along the confronting surfaces in a direction different from said first air stream;
wherein said first outlet port and said second outlet port have different opening widths in a sectional plane parallel to the surfaces of said liquid crystal panel, and the first outlet port and the second outlet port are provided on a plane that includes the sectional plane,
wherein the first air stream impinges upon the second air stream on the surfaces of the liquid crystal panel, and
wherein the first air stream impinges upon the second air stream at a central portion of the liquid crystal panel.

19. A cooling device for an electronic apparatus including a panel member including a planar heat radiating surface, the cooling device comprising:
a first cooling fan which generates a first air stream;
a first cooling duct including a first opening which is formed adjacent to a first end of the panel member and substantially perpendicular to the panel member, and directs the first air stream to flow along the planar heat radiating surface in a first direction at the first end of the panel member;
a second cooling fan which generates a second air stream; and
a second cooling duct including a second opening which is formed adjacent to a second end of the panel member and substantially perpendicular to the panel member, and directs the second air stream to flow along the planar heat radiating surface in a second direction different from the first direction at the second end of the panel member,
wherein the second opening comprises a width which is different than a width of the first opening in a sectional plane parallel to the planar heat radiating surface, and the first opening and the second opening are provided on a plane that includes the sectional plane,
wherein the first air stream impinges upon the second air stream on the planar heat radiating surface between the first and second ends of the panel member, and
wherein the first air stream impinges upon the second air stream at a central portion of the panel.

* * * * *